United States Patent [19]
Ford

[11] Patent Number: 6,048,408
[45] Date of Patent: Apr. 11, 2000

[54] METHOD OF FILTERING DEBRIS FROM FLUID BACK SPLASH

[76] Inventor: John L. Ford, 2310 27th St. South, St. Petersburg, Fla. 33712

[21] Appl. No.: 09/080,888

[22] Filed: May 18, 1998

[51] Int. Cl.[7] ............................... B08B 3/02; B08B 3/04; B08B 3/14
[52] U.S. Cl. ............................... 134/10; 134/38; 134/42; 134/104.4
[58] Field of Search .................................. 134/10, 38, 42, 134/104.1, 104.2, 104.4

[56] References Cited

U.S. PATENT DOCUMENTS

| | | | |
|---|---|---|---|
| 4,559,140 | 12/1985 | Croteau | 210/497.2 |
| 5,119,849 | 6/1992 | Hinkley | 134/104.1 |
| 5,406,966 | 4/1995 | Lepkowski et al. | 134/104.4 |
| 5,567,323 | 10/1996 | Harrison, Jr. | 210/251 |
| 5,569,377 | 10/1996 | Hashimoto | 210/238 |
| 5,611,728 | 3/1997 | Arold | 454/158 |
| 5,632,243 | 5/1997 | Buchholz | 123/198 E |
| 5,632,888 | 5/1997 | Chinn et al. | 210/163 |
| 5,635,079 | 6/1997 | Becking, II | 210/767 |

*Primary Examiner*—Zeinab El-Arini
*Attorney, Agent, or Firm*—Pendorf & Cutliff

[57] ABSTRACT

A method of filtering debris from the fluid back splash off a structure that is being pressure washed. The fluid falling onto a filter screen and passing through the filter screen before entering the ground. The filter screen made of glass threads woven into a filament. The filament is woven to form a sheet having a width greater than three feet and a length greater than three feet. The sheet has peripheral end edges with a border of flexible material disposed therearound. The border has a top side and a bottom side. A plurality of pile-type fastener means are attached along the top side and the bottom side of the border and symmetrically spaced thereabout. The plurality of pile-type fastener means couple with corresponding fastener means when the sheet is rolled.

6 Claims, 2 Drawing Sheets

METHOD OF FILTERING DEBRIS FROM FLUID BACK SPLASH

BACKGROUND OF THE INVENTION

1. Field of the Invention

The present invention relates to a method and apparatus for filtering water and removal of debris and more particularly pertains to removing paint chips and debris from the back splash of fluid falling away from the wall of a building that is being pressure cleaned.

2. Description of the Prior Art

The use of filters is known in the prior art. More specifically, water filters heretofore devised and utilized for the purpose of removing matter from water flow are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,635,079 to Becking, II discloses a method for filtering treated water and apparatus to practice the method. The method teaches a water purifying apparatus that receives a pair of containers and reduces spillage of the water from the apparatus.

U.S. Pat. No. 5,632,888 to Chinn, Strawser and Chinn discloses a filter for removing particulate mater from water flowing into an inlet, such as a catch basin. The filter is comprised of an envelope of filter material adapted to receive an inlet cover device.

U.S. Pat. No. 5,632,243 to Buchholz discloses a self-cleaning air filter assembly for an internal combustion engine. In particular the invention prevents particulates and heavier debris from entering the engine.

U.S. Pat. No. 5,611,728 to Arold discloses a dust filter which is surrounded by a frame and is held exchangeably in an air duct for a heating or air-conditioning system of a motor vehicle.

U.S. Pat. No. 5,569,377 to Hashimoto discloses spray paint equipment combining a paint gun and stand serving to facilitate the provision of filtered paint into the paint spray gun.

U.S. Pat. No. 5,567,323 to Harrison, Jr. discloses a intake filter for a paint sprayer, the filter for filtering liquid material or compositions adapted or capable of being filtered and then sprayed onto a surface.

Lastly, U.S. Pat. No. 4,559,140 to Croteau discloses a paint filter and method of making the same. Specifically the present invention has a conical receptacle with a conically tapering side wall formed of stiff sheet material and a lower filtration portion that is formed with a filtration mesh screen.

In this respect, the method and apparatus for filtering water and removal of debris according to the present invention substantially departs from the conventional concepts and designs of the prior art, and in so doing provides an apparatus primarily developed for the purpose of removing paint chips and debris from the back splash of fluid falling away from the wall of a building that is being pressure cleaned.

Therefore, it can be appreciated that there exists a continuing need for a new and improved method and apparatus for filtering water and removal of debris which can be used for removing paint chips and debris from the back splash of fluid falling away from the wall of a building that is being pressure cleaned. In this regard, the present invention substantially fulfills this need.

SUMMARY OF THE INVENTION

In view of the foregoing disadvantages inherent in the known types of water filters now present in the prior art, the present invention provides an improved method and apparatus for filtering water and removal of debris. As such, the general purpose of the present invention, which will be described subsequently in greater detail, is to provide a new and improved method and apparatus for filtering water and removal of debris. Specifically the invention is intended to provide an inexpensive yet environmentally safe way and effective way to remove hazardous debris from the back splash of the fluid used in pressure cleaning buildings.

In use, the present invention essentially comprises a forming a sheeting of a filter screen. The filter screen has a flexible boarder therearound to give the sheeting form and weight. Positioning the sheeting above a receiving service and adjacent a wall base of the building that is going to be pressure cleaned. Once the sheeting is in place couple a first and second hose to a compressor. The compressor is activated the fluid is released from the second hose at such a high velocity that lose paint and other material is removed from the building's wall. The lose debris and fluid back splash falling onto the filter screen, wherein the fluid passes through the filter screen leaving the debris on the filter screen.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved method and apparatus for filtering water and removal of debris which has all the advantages of the prior art water filters and none of the disadvantages.

It is another object of the present invention to provide a new and improved method and apparatus for filtering water and removal of debris which may be easily and efficiently used, manufactured and marketed.

It is a further object of the present invention to provide a new and improved method and apparatus for filtering water and removal of debris wherein the apparatus is of a durable and reliable construction.

An even further object of the present invention is to provide a new and improved method and apparatus for filtering water and removal of debris which is susceptible of a low cost of manufacture with regard to both materials and labor, and which accordingly is then susceptible of low prices of sale to the consuming public, thereby making such method and apparatus for filtering water and removal of debris economically available to the buying public.

Still yet another object of the present invention is to provide a new and improved Method and apparatus for filtering water and removal of debris which provides in the apparatuses and methods of the prior art some of the advantages thereof, while simultaneously overcoming some of the disadvantages normally associated therewith.

Still another object of the present invention is to remove paint chips and debris from the back splash of fluid falling away from the wall of a building that is being pressure cleaned.

Lastly, it is an object of the present invention to provide a method of filtering debris from the fluid back splash off a structure that is being pressure washed. The fluid falling onto a filter screen and passing through the filter screen before entering the ground. The filter screen made of glass threads woven into a filament. The filament is woven to form a sheet having a width greater than three feet and a length greater that three feet. The sheet has peripheral end edges with a border of flexible material disposed therearound. The border has a top side and a bottom side. A plurality of pile-type fastener means are attached along the top side and the bottom side of the border and symmetrically spaced thereabout. The plurality of pile-type fastener means couple with corresponding fastener means when the sheet is rolled.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
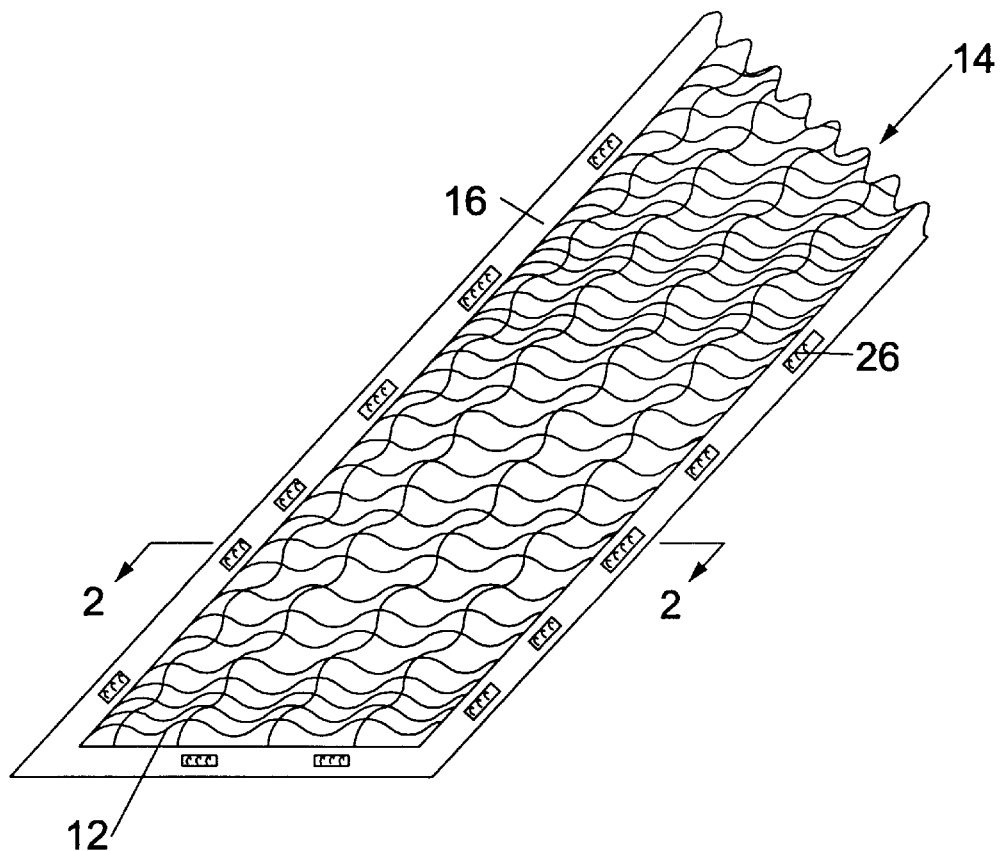
FIG. 1 is a perspective illustration of the preferred embodiment of the filter screen for filtering water and removal of debris constructed in accordance with the principles of the present invention.
Figure 2:
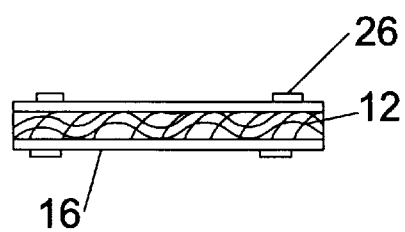
FIG. 2 is a cross sectional view of the filter sheet taken along line 2—2 of FIG. 1.

With reference now to the drawings, and in particular to FIGS. 1 and 2 thereof, a new and improved Method and apparatus for filtering water and removal of debris embodying the principles and concepts of the present invention and generally designated by the reference numeral 10 will be described.

The present invention, the new and improved Method and apparatus for filtering water and removal of debris, is comprised of a plurality of components. Such components in their broadest context include a filter screen, a border and a plurality of pile type fasteners. Such components are individually configured and correlated with respect to each other so as to attain the desired objective.

More specifically, the present invention includes method of filtering debris from the fluid back splash off a structure that is being pressure washed. The fluid falling onto a filter screen 10 and passing through the filter screen before entering the ground. The filter screen is formed of glass threads woven into a filament 12 with the filament being woven to form the sheet 14, as shown in FIG. 1. The sheet has a width greater than three feet and a length greater that three feet.

Also, the sheet has a flexible boarder 16. The boarder is formed of a flexible material. The material is preferably a light weight plastic that will give the sheet form and weight. Now that the filter screen is in the form of a sheeting of a filter screen the apparatus is ready for use.

Figure 3:
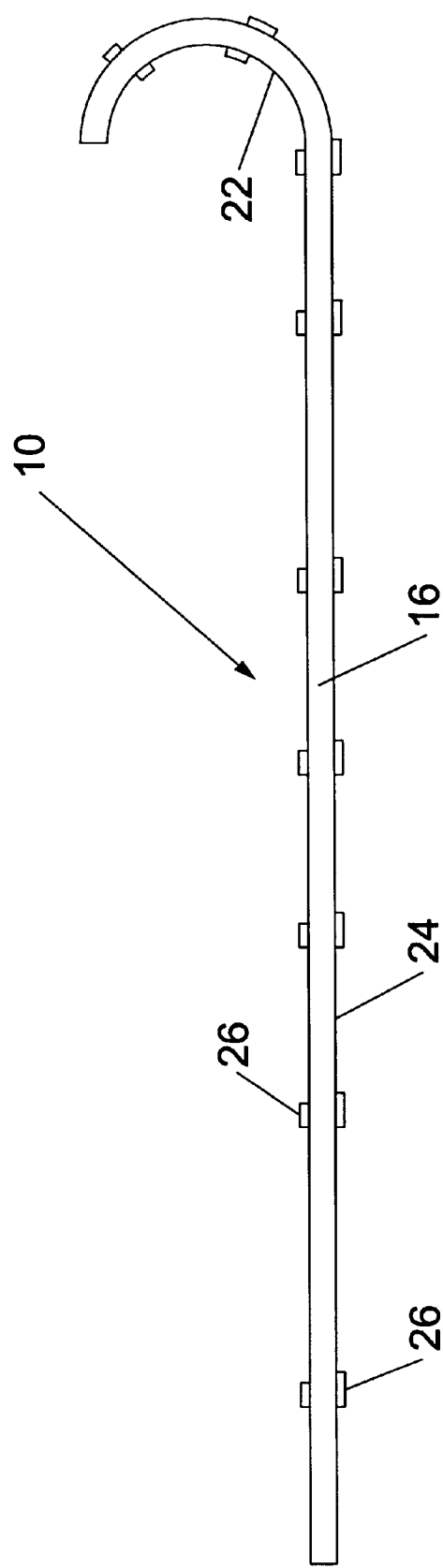
FIG. 3 is a side view of the present invention as set forth in FIG. 1 showing the filter sheet beginning to be rolled.

The sheeting is purchased in a roll as shown in FIG. 3. The boarder has a top side 22 and a bottom side 24. Each side has a plurality of pile-type fasteners 26 attached. The pile type fasteners allow the sheeting to be secured when in a roll position. Additionally the pile-type fasteners allow a plurality of filter screen sheet to be coupled together for enlarging the filter screen size during use.

Once the sheet is unrolled it is positioned above a receiving service and adjacent a wall base of a building that is going to be pressure cleaned. The sheeting of filter screen is position so as not to restrict the free flow of a fluid passing therethrough.

Now that the filter screen is in position a first hose is coupled to a water supply at one end and to an intake end of a compressor at the other end. Then a second hose is coupled to an outlet end of compressor for dispensing the fluid through the second hose at a high velocity. The compressor is activated.

Finally, the second hose is aimed at a wall of the building to be pressure cleaned. The pressurized fluid is released from the second hose and sprayed onto the building to remove loose debris with the back splash of the fluid. The lose debris and fluid back splash fall onto the filter screen, wherein the fluid passes through the filter screen leaving the debris on the filter screen.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of filtering debris from a fluid back splash off a structure that is being pressure washed, the fluid falling onto a filter screen and passing through the filter screen before falling a ground to be absorbed, the method comprising the steps of:

forming a sheeting of a filter screen having a flexible border therearound;

positioning the sheeting of filter screen above a receiving service and adjacent a wall base of a building that is going to be pressure cleaned;

positioning the sheeting of filter screen so as not to restrict a free flow of a fluid passing therethrough;

coupling a first hose to a water supply at one end and to an intake end of a compressor at one other end;

coupling a second hose to an outlet end of the compressor for dispensing the fluid through the second hose at a high velocity;

activating the compressor; and aiming the second hose at a wall of the building to be pressure cleaned and allowing a pressurized fluid to be sprayed onto the building to remove loose debris with the back splash of the fluid, the loose debris and fluid back splash falling onto the filter screen, wherein the fluid passes through the filter screen leaving the debris on the filter screen.

2. The method of filtering debris from a fluid back splash as set forth in claim 1, wherein the filter screen forming the sheeting is a filament that is woven.

3. The method of filtering debris from a fluid back splash as set forth in claim 2 wherein the filament being formed from woven glass threads.

4. The method of filtering debris from a fluid back splash as set forth in claim 1, wherein the border having a top side and a bottom side.

5. The method of filtering debris from a fluid back splash as set forth in claim 4, wherein the top side of the border having a plurality of pile-type fastener means attached thereto, and the bottom side of the border having a plurality of pile-type fastener means attached thereto.

6. The method of filtering debris as set forth in claim 4, further including the steps of:

rolling-up the sheeting and allowing the plurality pile-type fastener means of the top and bottom side of the border to couple for securing the sheeting in a roll orientation.

* * * * *